(12) United States Patent
Nagasawa

(10) Patent No.: US 9,706,067 B2
(45) Date of Patent: Jul. 11, 2017

(54) INFORMATION PROCESSING TERMINAL AND NON-TRANSITORY READABLE RECORDING MEDIUM FOR FILE TRANSFER AND FILE PROCESSING

(71) Applicant: Konica Minolta, Inc., Tokyo (JP)

(72) Inventor: Kenichi Nagasawa, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/079,508

(22) Filed: Mar. 24, 2016

(65) Prior Publication Data
US 2016/0286058 A1  Sep. 29, 2016

(30) Foreign Application Priority Data
Mar. 25, 2015 (JP) .................................. 2015-062131

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/00307* (2013.01); *G06F 3/1204* (2013.01); *G06F 3/1205* (2013.01); *G06F 3/1236* (2013.01); *G06F 3/1254* (2013.01); *G06F 3/1292* (2013.01); *H04N 2201/0094* (2013.01)

(58) Field of Classification Search
CPC ........ H04N 1/00307; H04N 2201/0094; G06F 12/04; G06F 3/1205; G06F 3/1236
USPC ............... 358/1.1, 1.15, 1.13, 1.14
See application file for complete search history.

(56) References Cited

U.S. PATENT DOCUMENTS

| 2008/0174790 A1* | 7/2008 | Noguchi | H04N 1/2179 358/1.1 |
| 2014/0320903 A1 | 10/2014 | Kyoo | |
| 2015/0029527 A1* | 1/2015 | Nakata | G06F 3/12 358/1.13 |

FOREIGN PATENT DOCUMENTS

| JP | H08-147118 A | 6/1996 |
| JP | 2005-044300 A | 2/2005 |
| JP | 2014-215927 A | 11/2014 |

OTHER PUBLICATIONS

Office Action in counterpart Japanese Patent Application No. 2015-062131 issued on Mar. 21, 2017 (8 pages).

* cited by examiner

*Primary Examiner* — Douglas Tran
(74) *Attorney, Agent, or Firm* — Osha Liang LLP

(57) ABSTRACT

An information processing terminal includes an operating system that runs applications. A first application is run by the operating system and manages a file, and a second application is run by the operating system when a request to output the file is issued by the first application. The information processing terminal further includes a hardware processor that, by the second application, obtains the file from the first application via the operating system, refers to file processing information and determines a process that should be performed about the obtained file, and processes the obtained file according to the determined process. The process that should be performed when the file is obtained is associated with the first application and registered with the file processing information.

24 Claims, 14 Drawing Sheets

INFORMATION PROCESSING TERMINAL 1

FIG. 8

FILE PROCESSING INFORMATION 14

| APPLICATION | PROCESS |
|---|---|
| FILE MANAGEMENT APPLICATION | AUTOMATIC PRINT |
| APPLICATION A | DISPLAY PRINT SETTING SCREEN |
| APPLICATION B | DISPLAY FILE |
| APPLICATION C | — |
| APPLICATION D | — |
| UNREGISTERED APPLICATION | AUTOMATIC PRINT |

INFORMATION PROCESSING TERMINAL AND NON-TRANSITORY READABLE RECORDING MEDIUM FOR FILE TRANSFER AND FILE PROCESSING

This application is based on the application No. 2015-062131 filed in Japan, the contents of which are hereby incorporated by reference.

BACKGROUND OF THE INVENTION

Field of the Invention

The present invention relates to an information processing terminal and a non-transitory readable recording medium. The present invention more specifically relates to a technique of transferring a file between multiple applications and performing a process about the file at the information processing terminal.

Description of the Background Art

As operating systems of information processing terminals such as smartphones and tablet terminals, AndroidOS and iOS have become popular. These operating systems have an application cooperative function that enables multiple applications to work together. For AndroidOS, for example, there is the application cooperative function by explicit intents and implicit intents. For iOS, there is the application cooperative function by URL scheme and Open In. By using such application cooperative function, an application running on the information processing terminal is capable of calling and running another application.

It is assumed for example a first application provided by a third vendor calls and runs a second application that sends a job to an image forming device such as one of MFPs (Multifunction Peripherals) at the conventional information terminal that has the application cooperative function. In this case, user information including a user name is provided to the second application from the first application via the operating system so that a setting screen about the job corresponding to the user's function restriction identified by the user information may be displayed when the second application is run. This known technique is introduced for example in Japanese Patent Application Laid-Open No. JP 2014-215927 A. More specifically, for running the second application with the application cooperative function, the first application controls initial operations of the second application.

It is bothersome for the user to appear the setting screen about the job all the time when the application to send the job to the image forming device is run with the application cooperative function as described above. More specifically, the user sometimes would like to send the job immediately without making any change to the default print settings. Even in such a case, if the setting screen about the job appears all the time, the user is required to make some operations to the setting screen. The user feels bothersome and is not allowed to get a printed output immediately.

The user may send the job without making any change to the default print settings as to files managed by a certain application. The user, on the other hand, may wish to send the job after configuring the print settings in detail as to files managed by the other application. In this case, the conventional first application that runs the second application with the application cooperative function is required to specify the initial operations of the second application.

If the first application is provided by the third vendor, the first application is not always allowed to specify the initial operations of the second application. According to the conventional technique as described above, if the application that calls another application is not allowed to specify the initial operations, the application called and run with the application cooperative function is not allowed to determine automatically the process at the startup.

SUMMARY

One or more embodiments of the present invention provide an information processing terminal and a non-transitory computer readable recording medium capable of automatically determining a process which is performed after an application is run and proceeding with the process when the application is run with an application cooperative function no matter what application calls the application.

First, one or more embodiments of the present invention are directed to an information processing terminal that includes an operating system that runs applications; a first application that is run by the operating system and manages a file; and a second application that is run by the operating system when a request to output the file is issued by the first application.

According to one aspect of this invention, the information processing terminal comprises: an hardware processor configured to, by the second application; obtain the file from the first application via the operating system, refer to file processing information and determines a process that should be performed about the obtained file by the file obtaining par, the process that should be performed when the file is obtained being associated with the first application and registered with the file processing information, and process the obtained file according to the determined process.

Second, one or more embodiments of the present invention are directed to a non-transitory computer readable recording medium storing a program to be executed by an operating system on an information processing terminal when a request for output of a file is issued by an application as the application that manages the file is run by the operating system of the information processing terminal.

According to one aspect of this invention, execution of the program by the operating system causing the information processing terminal to execute the steps of: (a) obtaining the file from the application via the operating system; (b) referring to file processing information and determining a process that should be performed about the file obtained in the step (a), the process that should be performed when the file is obtained being associated with the application and registered with the file processing information; and (c) processing the file obtained in the step (a) according to the process determined in the step (b).

BRIEF DESCRIPTION OF THE DRAWINGS

FIG. 8 shows an example of file processing information;

DETAILED DESCRIPTION

Figure 1:
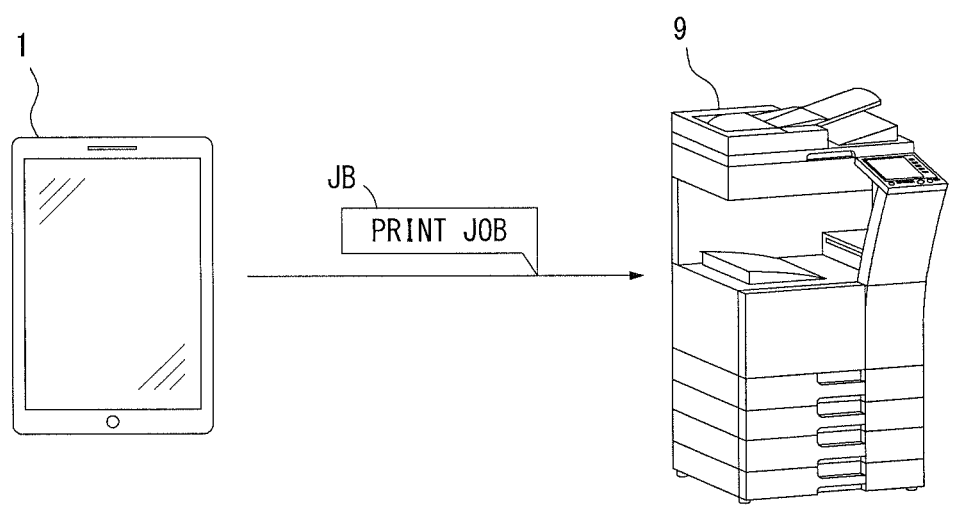
FIG. 1 shows an exemplary configuration of an image forming system that comprises an information processing terminal.

Embodiments of the present invention are described in detail below with reference to figures. In the description given below, those elements which are shared in common among figures are represented by the same reference numerals, and these elements are not discussed repeatedly for the same description.

FIG. 1 shows an exemplary configuration of an image forming system that comprises an information processing terminal 1 of one or more embodiments of the present invention. The image forming system comprises the information processing terminal 1 and an image forming device 9 constructed by a device such as one of MFPs. The information processing terminal 1 and the image forming device 9 are capable of sending and receiving data to and from each other over a network with wire or wireless communication.

The information processing terminal 1 is constructed by a device such as a smartphone, a tablet terminal or a portable personal computer, for instance. Multiple applications may be installed on the information processing terminal 1. The multiple applications include a cooperative application for the information processing terminal 1 to send a print job JB to the image forming device 9. The information processing terminal 1 runs the cooperative application, thereby generating the print job JB and sending to the image forming device 9.

The image forming device 9 includes multiple functions such as a copy function, a scan function, a print function and a fax function, for example. The image forming device 9 is capable of executing the job corresponding to each function. As shown in FIG. 1, for instance, after receiving the print job JB from the information processing terminal 1, the image forming device 9 executes the received print job JB, thereby producing a printed output.

Figure 2:
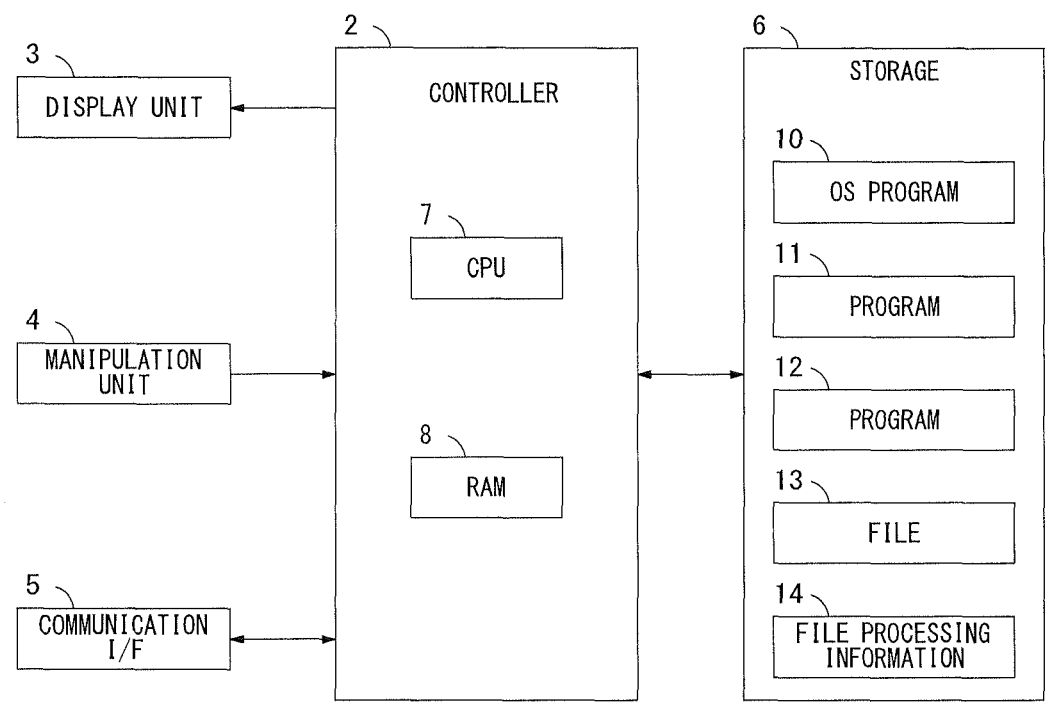
FIG. 2 is a block diagram showing an example of a hardware structure and that of a functional structure of the information processing terminal.

FIG. 2 is a block diagram showing an example of a hardware structure and that of a functional structure of the information processing terminal 1. As the hardware structure, the information processing terminal 1 includes a controller 2, a display unit 3, a manipulation unit 4, a communication interface 5 and a storage 6. The controller 2 includes a CPU 7 and a RAM 8. The CPU 7 executes a variety of programs, thereby fulfilling various types of functions. The RAM 8 stores therein data such as temporal data generated when the CPU 7 executes the program. The display unit 3 formed from a device such as a color liquid crystal display, for example, displays a variety of information. The manipulation unit 4 is formed with parts such as touch panel keys arranged on the screen of the display area of the display unit 3, for example. The manipulation unit 2 detects operations by a user. The communication interface 5 connects the information processing terminal 1 to the network to establish communication with a device such as the image forming device 9. The storage 6 is formed from a nonvolatile storage device such as a solid state drive (SSD) or a hard disk drive (HDD), for instance. Information including the variety of programs and various types of information are stored in the storage 6. An OS program 10, programs 11 and 12, a file 13 and file processing information 14 are stored in the storage 6. The OS program 10 brings an operating system into function, and the programs 11 and 12 brings the application into function. The file 13 is an electronic file such as a document and an image.

Figure 3:
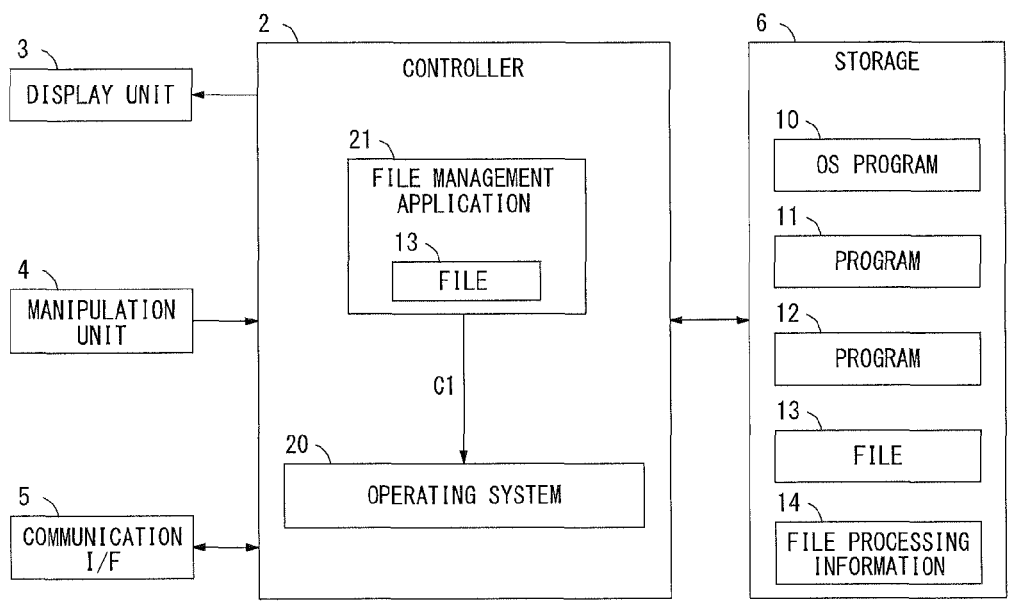
FIG. 3 shows a state when an operating system and a file management application are run on a controller.

FIG. 3 shows a state when an operating system 20 and a file management application (a first application) 21 are run on the controller 2. After the information processing terminal 1 is powered on, the CPU 7 of the controller 2 reads and executes the OS program 10 in the storage 6. The controller 2 then runs the operating system 20 as shown in FIG. 3. The operating system 20 has an application cooperative function that enables the multiple applications to work together. AndroidOS and iOS can be an example of the operating system 20. In what follows, the operating system 20 is iOS as an example, and that enables the multiple applications to work together by Open In cooperative.

It is assumed that the operating system 20 is running on the controller, and the user gives an instruction to run the file management application 21 through the manipulation unit 4. In this case, the CPU 7 reads and executes the program 11 corresponding to the file management application 21 in the storage 6. Thus, the controller 2 runs the file management application 21 on the operating system 20 as shown in FIG. 3. The file management application 21 manages the file 13 such as the document and the image stored in the storage 6. The file management application 21 is provided by another vendor who is different from a cooperative application (a second application) 22 which is described later, for example.

Figure 4:
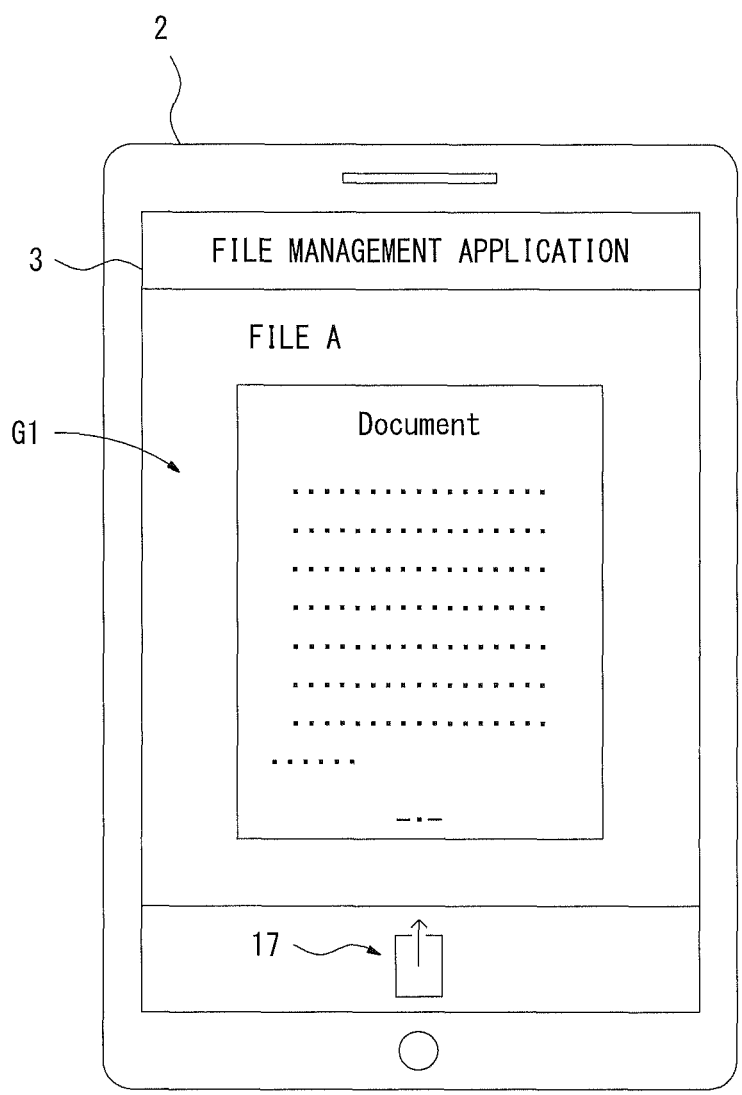
FIG. 4 shows an example of a screen displayed by the file management application.

After the file management application 21 is run on the controller 2, the file management application 21 reads the file 13 in the storage 6 and expands the read file 13 into the RAM 13, thereby enabling contents such as the document and/or the image included in the file 13 to be displayed on the display unit 3. FIG. 4 shows an example of a screen G1 displayed on the display unit 3 by the file management application 21. The file management application 21 displays the contents such as the document and/or the image included in the file 13 in the center of the display unit 3 and an icon 17 for the file management application 21 to work together with another application in the lower part of the display unit 3. To be more specific, the user taps the icon 17 when he or she gives an instruction to output the file 13 that is opened by the file management application 21 by Open In cooperation of the operating system 20 to another application. After the user taps the icon 17, the file management application 21 sends a file request C1 that requests for the output of the file 13 currently opened to another application to the operating system 20 as shown in FIG. 3. The file request C1 is electronic data described in a predetermined format for Open In cooperation and contains information relating to the file 13.

Figure 5:
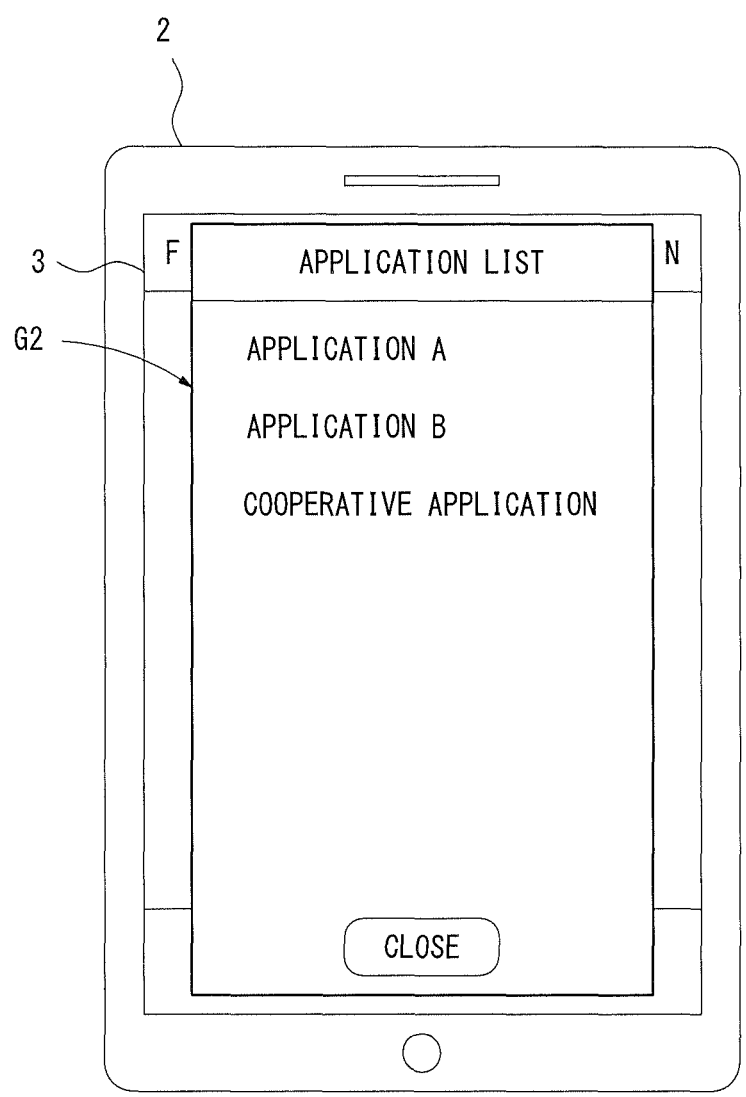
FIG. 5 shows an example of a screen of an application list displayed by the operating system.

After receiving the file request C1 from the file management application 21, the operating system 20 is allowed to handle the file 13 opened by the file management application 21 of all applications installed on the information processing terminal 1, and searches for another application that is capable of working together with the file management application 21. The operating system 20 then displays a list of the applications extracted through the search on the display unit 3. FIG. 5 shows an example of a screen of an application list G2 displayed on the display unit 3 by the operating system 20. The operating system 20 may extract multiple applications through the search for the application. In this case, the multiple applications are displayed on the application list G2 as shown in FIG. 5. The user selects the application from the application list G2, thereby specifying the application to which the file 13 is output. It is assumed, for example, the user would like to send the print job JB based on the file 13 to the image forming device 9. In this case, the user selects and taps the cooperative application from among the multiple applications on the application list G2.

Figure 6:
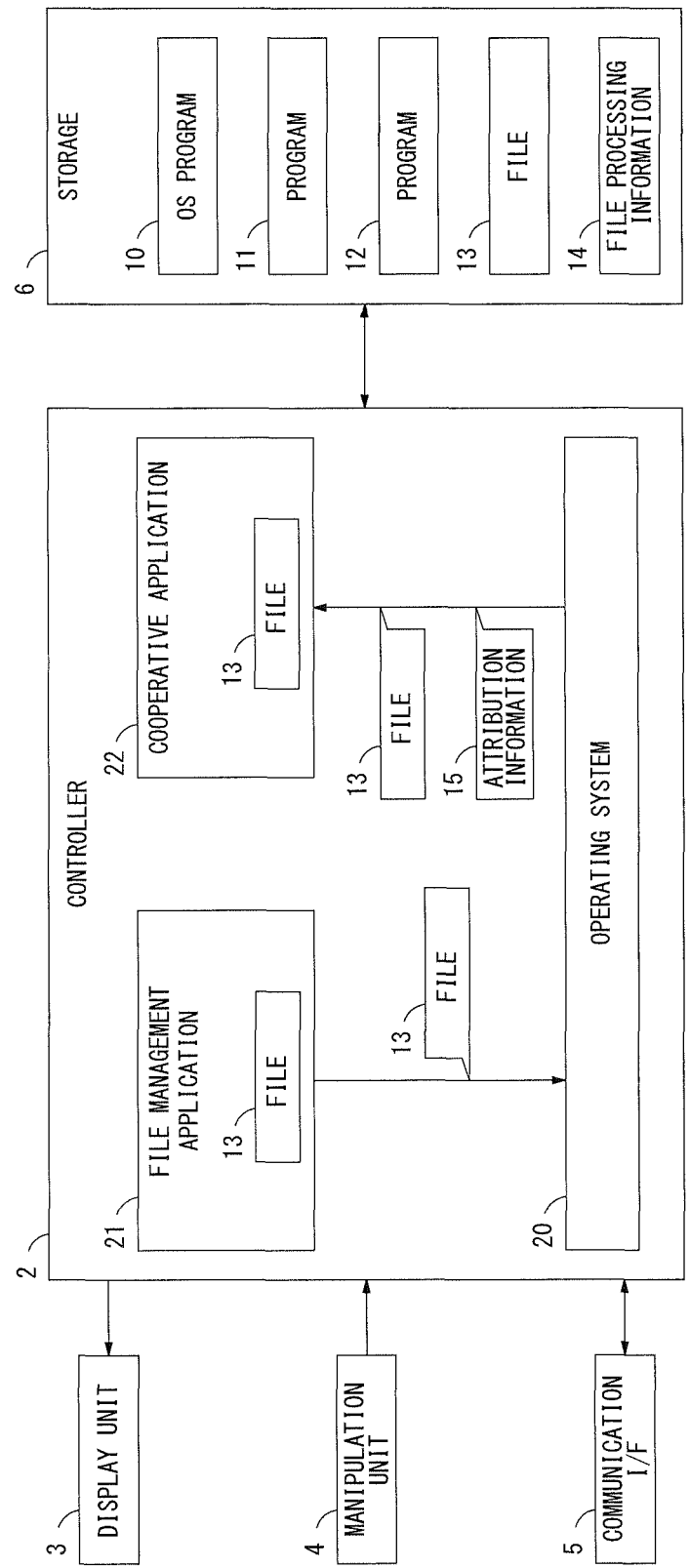
FIG. 6 shows a state when the operating system, the file management application and a cooperative application are run on the controller.

After the cooperative application is selected by the user, the operating system 20 reads the program 12 corresponding to the cooperative application in the storage 6, and enables the CPU 7 to execute the program 12 so that the cooperative application 22 is run on the controller 2. FIG. 6 shows a state when the operating system 20, the file management application (the first application) 21 and the cooperative application (the second application) 22 are run on the controller 2. The cooperative application 22 run by the operating system 20 has a function to work together with the image forming device 9. The cooperative application 22 is capable of generating the print job JB to enable the image forming device 9 to produce the printed output and sending the generated print job JB to the image forming device 9.

As running the cooperative application 22 by Open In cooperation of the operating system 20, the file management application 21 outputs the file 13 to the operating system 20. The operating system 20 outputs the file 13 obtained from the file management application 21 to the cooperative application 22 when the cooperative application 22 is started to run. Hence, the cooperative application 22 is allowed to automatically obtain the file 13 already opened by the file management application 21 via the operating system 20.

The operating system 20 outputs attribution information 15 of Open In cooperation to the cooperative application 22 when the cooperative application 22 is started to run. The attribution information 15 includes information relating to the application with which cooperation is conducted, namely the file management application 21 from which the file 13 is output. Hence, the cooperative application 22 refers to the attribution information 15, thereby finding out that the file 13 obtained via the operating system 20 is provided from the file management application 21.

When the cooperative application 22 according to one or more embodiments of the present invention is run by the application cooperative function of the operating system 20, it automatically determines initial operations that should be carried out when it is started to run depending on the application from which the file 13 obtained via the operating system 20 is output and processes the file 13. The cooperative application 22 is described in detail below.

Figure 7:
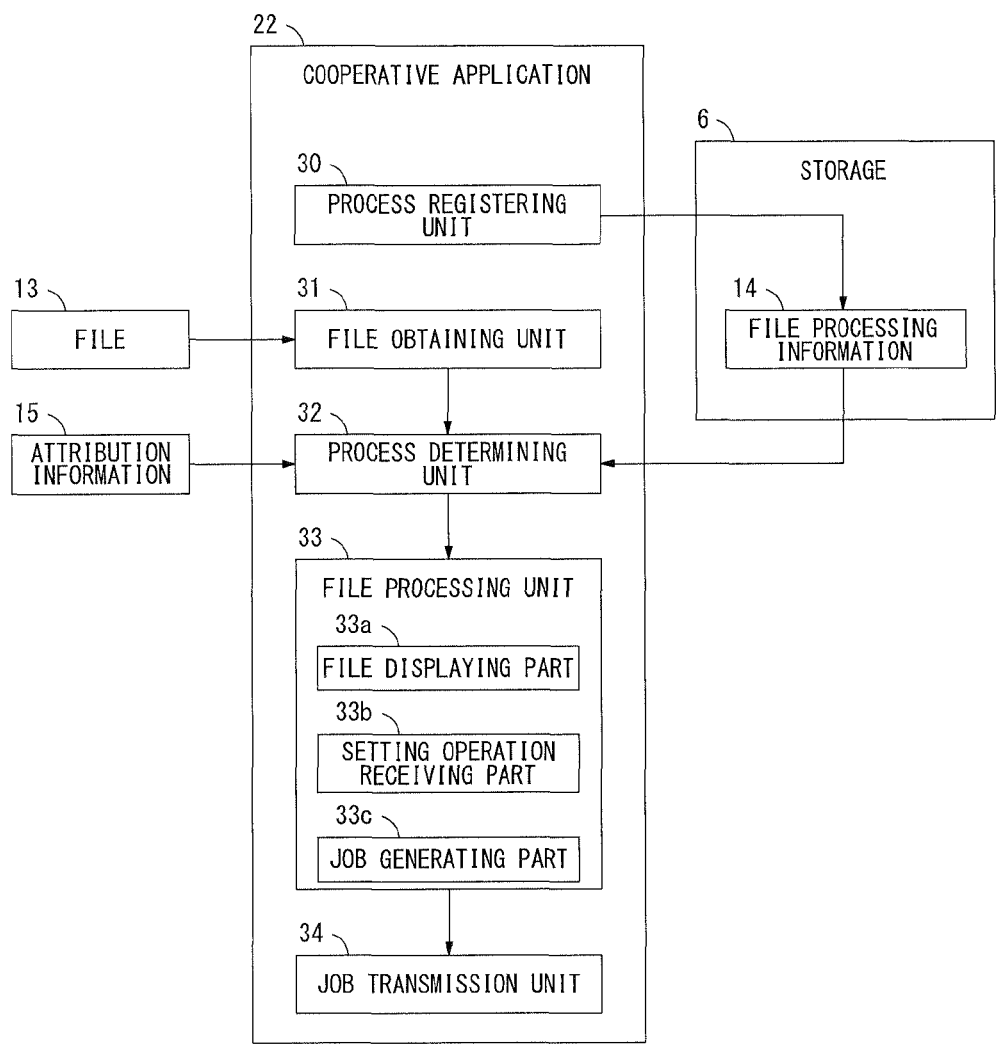
FIG. 7 is a block diagram showing in detail an example of a hardware structure and that of a functional structure of the cooperative application.

FIG. 7 is a block diagram showing in detail an example of a hardware structure and that of a functional structure of the cooperative application 22. The cooperative application 22 includes a process registering unit 30, a file obtaining unit 31, a process determining unit 32, a file processing unit 33 and a job transmission unit 34.

The process registering unit 30 generates the file processing information 14 and stores in the storage 6 to manage. The application that may be run on the information processing terminal 1 and a process that should be performed when the file 13 is obtained from the application are associated with each other and registered with the file processing information 14. The process registering unit 30 becomes operative when the user gives the instruction to register the process, for example. The process registering unit 30 associates the application and the process with each other and registers with the file processing information 14 based on the information input by the user through the manipulation unit 4. When the file 13 is obtained from the new application, the process registering unit 30 is capable of associating the new application and the process with each other and registering with the file processing information 14.

FIG. 8 shows an example of the file processing information 14. The file processing information 14 of FIG. 8 includes the information of "automatic print" as the process corresponding to the file management application 21. The file processing information 14 also includes information relating to applications A to D as the application besides the file management application 21. As the process, "display print setting screen" is registered for the application A. As the process, "display file" is registered for the application B. There is no process registered for the applications C and D. The process that should be performed when the file 13 is obtained from the application not registered with the file processing information 14 is also registered with the file processing information 14 as shown in FIG. 8. It is registered that "automatic print" is performed when the file 13 is obtained from the unregistered application.

The file obtaining unit 31 obtains the file 13 via the operating system 20 by the application cooperative function (Open In cooperation) of the operating system 20. After obtaining the file 13 from the operating system 20 when the cooperative application 22 is started to run, the file obtaining unit 31 brings the process determining unit 32 into operation.

The process determining unit 32 identifies the application from which the file 13 is output based on the attribution information 15 received from the operating system 20. The process determining unit 32 refers to the file processing information 14, thereby determining the process that should be performed about the file 13 obtained by the file obtaining unit 31. To be more specific, the process determining unit 32 determines if the application identified as the one from which the file 13 is output is registered with the file processing information 14. As a result, the application may be registered with the file processing information 14. In this case, the process determining unit 32 determines the process associated with the identified application in the file processing information 14 as the process that should be performed about the file 13 received from the operating system 20. It is assumed, for example, the cooperative application 22 obtains the file 13 which is output from the file management application 21 as shown in FIG. 6. In such a case, the process determining unit 32 determines "automatic print" as the process that should be performed about the file 13 based on the file processing information 14 of FIG. 8.

The file processing unit 33 processes the file 13 obtained by the file obtaining unit 31 according to the determined process. The file processing unit 33 serves as a variety of processing parts to perform the various types of processes specified by the user. FIG. 7 shows some of examples. The file processing unit 33 serves as a file displaying part 33a, a setting operation receiving part 33b and a job generating part 33c. The file displaying part 33a displays contents included in the file 13 obtained by the file obtaining unit 31 on the display unit 3. The setting operation receiving part 33b displays a setting screen about the job on the display unit 3, and receives the user operation to configure the setting. In response to receiving the user operation to configure the setting, the setting operation receiving part 33b updates the default print setting to the setting specified by the user. The job generating part 33c generates the print job JB based on the file 13 obtained by the file obtaining unit 31. The job generating part 33c is capable of generating the print job JB by applying the default print setting. It is assumed, for example, the setting operation receiving part 33b becomes operative and updates the default print setting to the setting specified by the user. In this case, the job generating part 33c is also capable of generating the print job JB by applying the print setting created by the setting operation receiving part 33b.

The process that should be performed about the file 13 may not be determined by the process determining unit 32. In this case, the file processing unit 33 displays an initial screen on the display unit 3 after the cooperative application 22 is started to run. The initial screen is a menu screen that enables the user to select to display the file or the print setting screen, for instance. When the process is not determined by the process determining unit 32, the user is required to operate one after the other from the initial screen of the cooperative application 22.

On the other hand, the process that should be performed about the file 13 may be determined by the process determining unit 32. In this case, the file processing unit 33 automatically performs the determined process. It is assumed, for example, "automatic print" is determined by the process determining unit 32. In this case, the file processing unit 33 brings the job generating part 33c into operation. The job generating part 33c applies the default print settings and automatically generates the print job JB. It is assumed, for example, "display print setting screen" is determined by the process determining unit 32. In this case, the file processing unit 33 brings the setting operation receiving part 33b into operation. The setting operation receiving part 33b automatically displays the print setting screen that enables the user to configure the setting about the print job JB on the display unit 3 based on the file 13 obtained by the file obtaining unit 31. It is assumed, for example, "display file" is determined by the process determining unit 32. In this case, the file processing unit 33 brings the file displaying part 33a into operation. The file displaying part 33a automatically displays the contents such as the document and/or the image included in the file 13 obtained by the file obtaining unit 31. Hence, when the process is determined by the process determining unit 32, the user is not required to operate one after the other from the initial screen of the cooperative application 22.

The job transmission unit 34 becomes operative when the print job JB is generated by the job generating part 33c. The job transmission unit 34 sends the print job JB to the image forming device 9 via the communication interface 5. The job transmission unit 34 sends the print job JB to the image forming device 9, thereby enabling the image forming device 9 to produce the printed output based on the contents included in the file 13.

Figure 9:
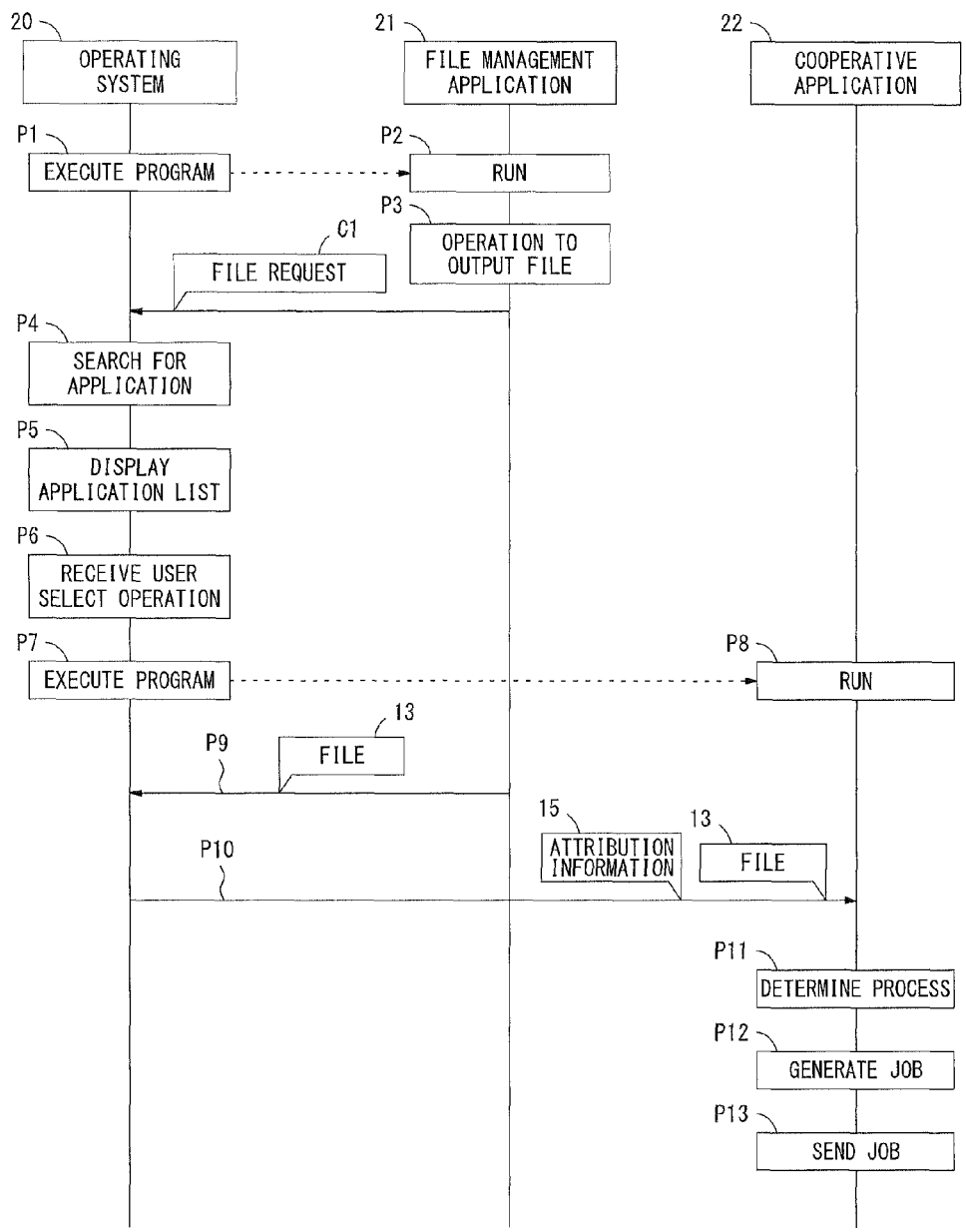
FIG. 9 shows an example of the cooperative process of the applications at the information processing terminal.

FIG. 9 shows an example of the cooperative process of the applications at the information processing terminal 1. In response to detecting the instruction to run the file management application 21 by the user, the operating system 20 executes the program 11 (process P1). The file management application 21 is then run on the information processing terminal 1 (process P2). After detecting the user operation to output the file for Open In cooperation, the file management application 21 outputs the file request C1 to the operating system 20 (process P3). In response to receiving the file request C1 from the file management application 21, the operating system 20 searches for the application that is capable of handling the file 13 from among the multiple applications installed on the information processing terminal 1 (process P4). The operating system 20 then displays the application list G2 on the display unit 3 as shown in FIG. 5 (process P5). The operating system 20 receives the user operation to select the application (process P6). If the cooperative application 22 is selected by the user, the operating system 20 reads and executes the program 12 corresponding to the cooperative application 22 (process P7). Thus, the cooperative application 22 is run on the information processing terminal 1 (process P8).

After the cooperative application 22 is run, the file management application 21 outputs the file 13 to the operating system 20 (process P9). When outputting the file request C1 to the operating system 20, the file management application 21 may output the file 13 to the operating system 20 at the same time. In such a case, the process in P9 is not necessary to be performed after the cooperative application 22 is run.

After running the cooperative application 22, the operating system 20 outputs the file 13 obtained from the file management application 21 to the cooperative application 22 (process P10). The operating system 20 outputs the attribution information 15 that includes the information relating to the file management application 21 from which the file 13 is output to the cooperative application 22. Hence, the cooperative application 22 is allowed to automatically obtain the file 13 and the attribution information 15 when it is started to run.

The cooperative application 22 refers to the file processing information 14 based on the attribution information 15 obtained from the operating system 20, thereby determining the process that should be performed about the file 13 (process P11). It is assumed, for example, the process thereby determined is "automatic print." In this case, the cooperative application 22 automatically generates the print job JB based on the file 13 obtained from the operating system 20 (process P12), and sends the generated print job JB to the image forming device 9 (process P13). The process of "automatic print" may be registered in advance as the process corresponding to the file management application 21. In this case, even though the user does not operate the cooperative application 22 run by the application cooperation, the print job JB based on the file 13 is automatically sent to the image forming device 9, resulting in reduced burden on the user.

Figure 10:
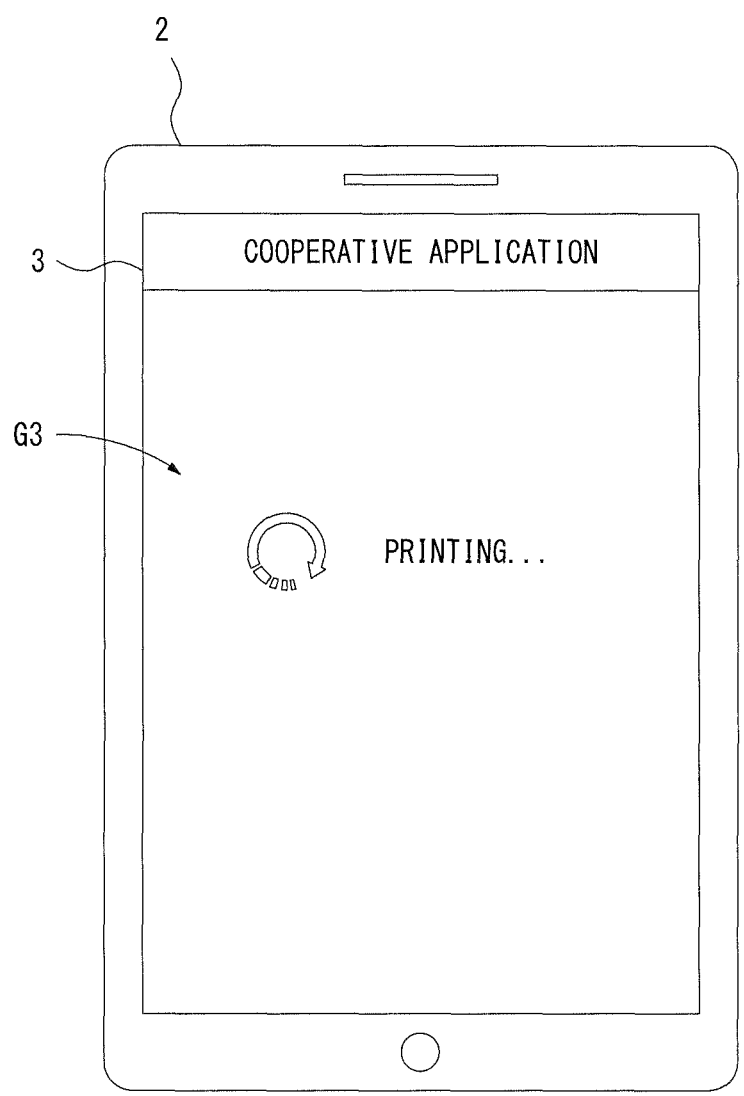
FIG. 10 shows an example of a screen displayed when the cooperative application automatically produces a printed output.

FIG. 10 shows an example of a screen displayed at the information processing terminal 1 when the cooperative application 22 automatically produces the printed output. The cooperative application 22 refers to the file processing information 14 after it is run, thereby determining to automatically produce the printed output based on the file 13. In this case, the cooperative application 22 displays a screen G3 that shows it is during printing at the image forming device 9 without displaying the initial screen on the display unit 3 of the information processing terminal 1 as shown in FIG. 10. As a result, the user is allowed to know that the printing is started at the image forming device 9 without making any operation on the initial screen and obtain the printed output immediately.

Figure 11A:
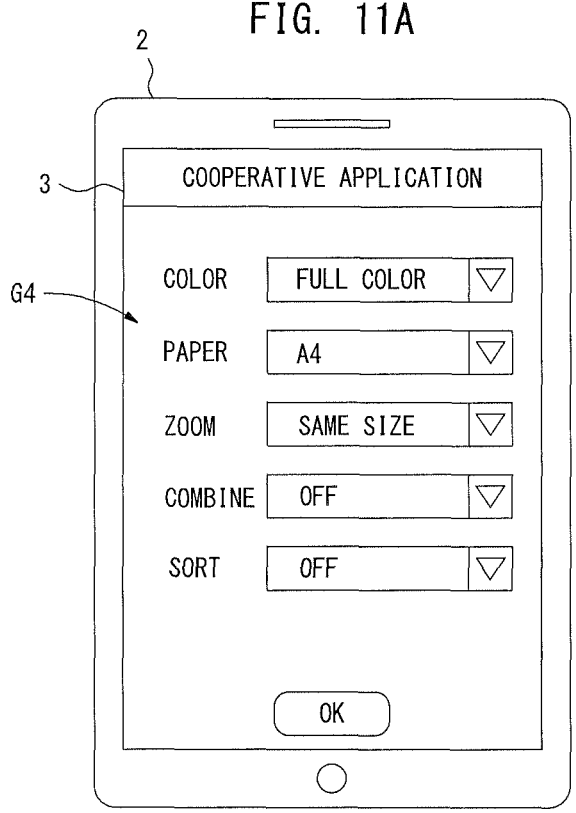
FIGS. 11A and 11B show an example of the other screens displayed at the information processing terminal after the cooperative application is run.
Figure 11B:
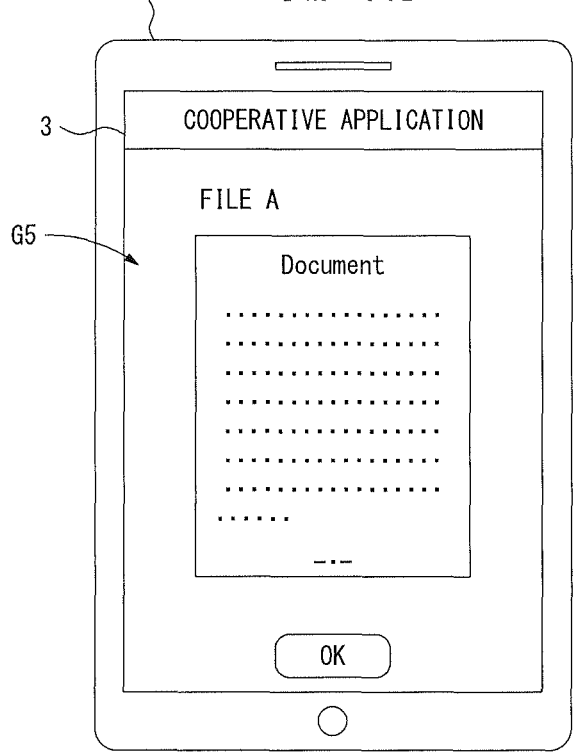

FIGS. 11A and 11B show an example of the other screens displayed at the information processing terminal 1 after the cooperative application 22 is run. FIG. 11A shows an example of the screen displayed when the cooperative application 22 refers to the file processing information 14 and displaying the print setting screen is determined as the process about the file 13. To be more specific, when determining to display the print setting screen about the file 13, the cooperative application 22 automatically displays a print setting screen G4 on the display unit 3 of the information processing terminal 1 without displaying the initial screen on the display unit 3. The user is allowed to configure the setting about the print job JB through the print setting screen G4. Hence, the user is allowed to immediately start the setting operation through the print setting screen G4 without operating the initial screen.

FIG. 11B shows an example of the screen displayed when the cooperative application 22 refers to the file processing information 14 and displaying the file is determined as the process about the file 13. To be more specific, when determining to display the file about the file 13, the cooperative application 22 automatically displays a file screen G5 on the display unit 3 of the information processing terminal 1 without displaying the initial screen on the display unit 3. The user is allowed to check the contents such as the document and/or the image included in the file 13 by viewing the file screen G5. Hence, the user is allowed to immediately check the contents included in the file 13 without operating the initial screen.

Figure 12:
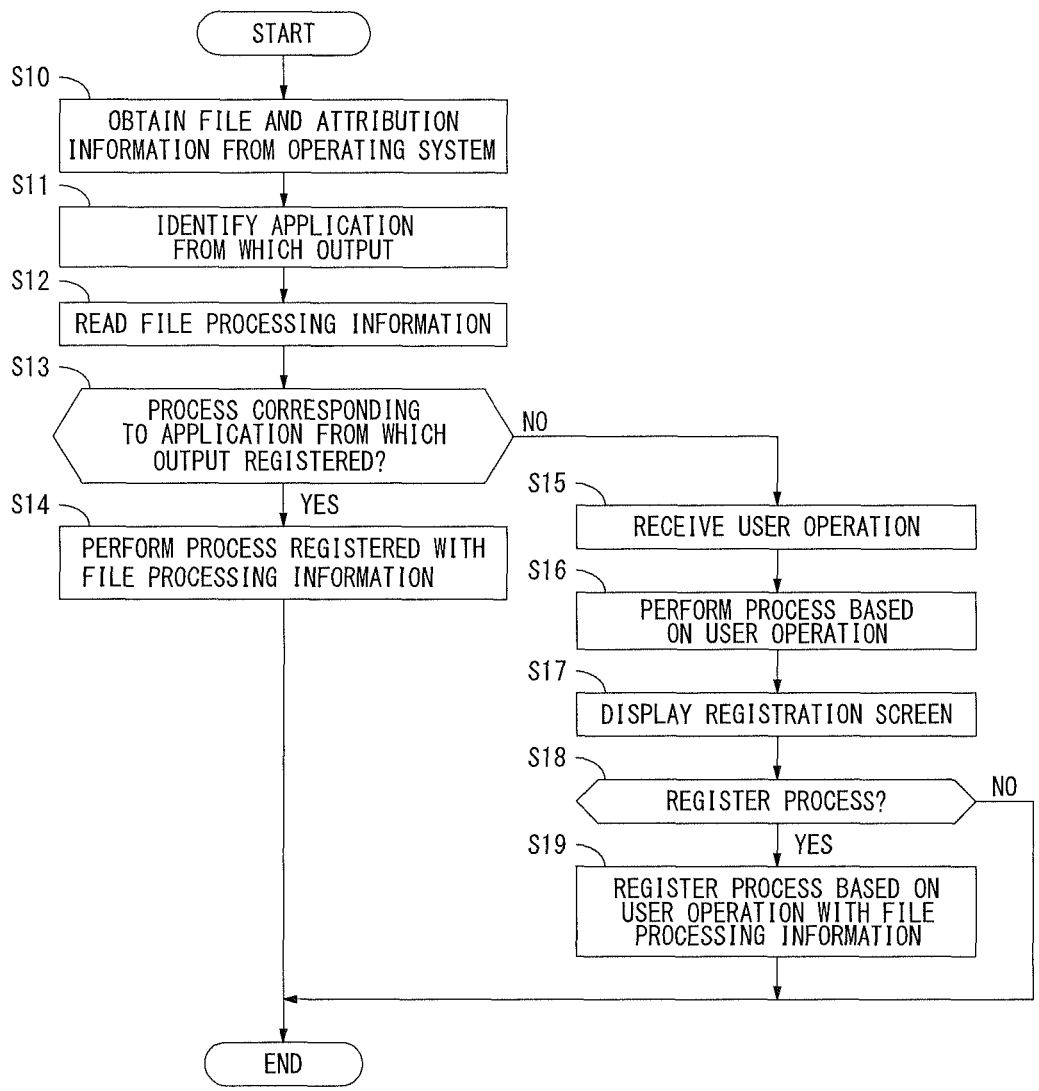
FIG. 12 is a flow diagram explaining an exemplary sequential procedure of the process performed by the cooperative application.

FIG. 12 is a flow diagram explaining an exemplary sequential procedure of the process performed by the cooperative application 22. After being run by the application cooperative function, the cooperative application 22 obtains the file 13 and the attribution information 15 from the operating system 20 (step S10). The cooperative application 22 identifies the application from which the file 13 is output based on the attribution information 15 obtained from the operating system 20 (step S11). The cooperative application 22 then reads the file processing information 14 in the storage 6, and determines if the process corresponding to the application from which the file 13 is output is registered with the file processing information 14 (step S13). When the process is registered (when a result of step S13 is YES), the cooperative application 22 performs the process registered with the file processing information 14 about the file 13 obtained from the operating system 20 (step S14). In this case, it is not necessary for the user to operate the cooperative application 22 from the initial screen.

When no process corresponding to the application from which the file 13 is output is registered with the file processing information 14 (when a result of step S13 is NO), the cooperative application 22 displays the initial screen on the display unit 3 and receives the user operation (step S15). The cooperative application 22 performs the process based on the user operation (step S16).

Figure 13:
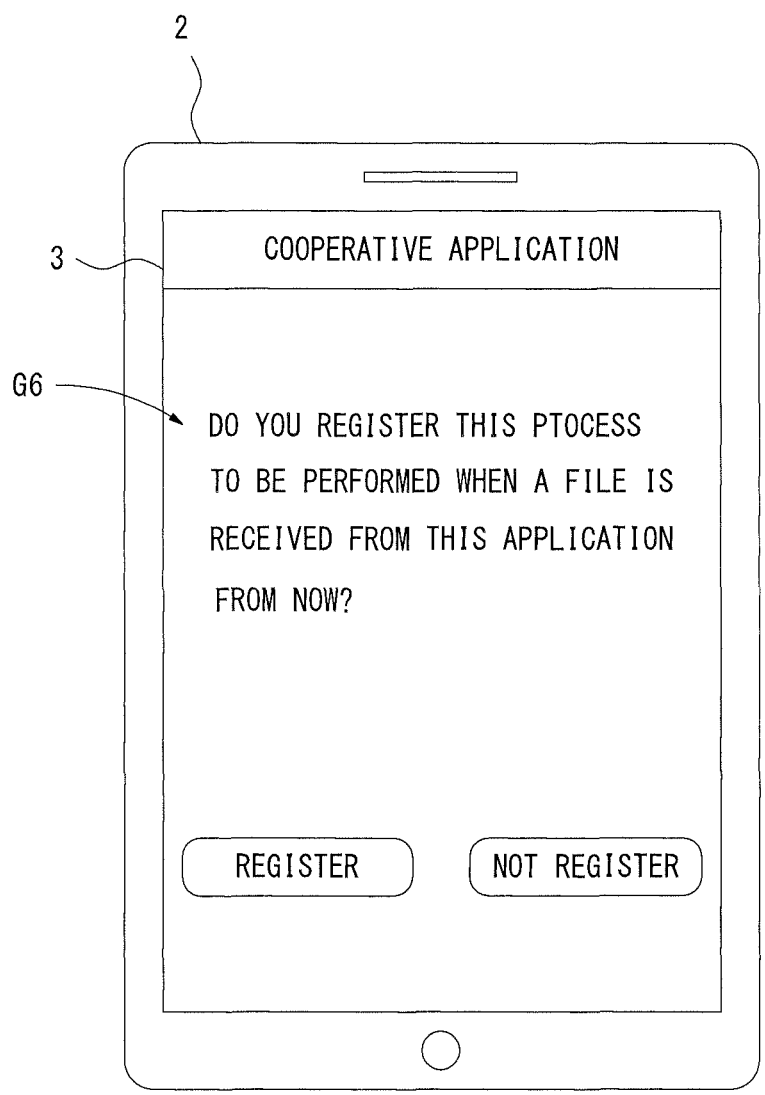
FIG. 13 shows an example of a registration confirmation screen.

After performing the process based on the user operation, the cooperative application 22 brings the process registering unit 30 into operation. More specifically, the process determining unit 32 may determine that the process corresponding to the application from which the file 13 is output is not registered with the file processing information 14. In such a case, the cooperative application 22 brings the process registering unit 30 into operation to display a registration confirmation screen on the display unit 3 (step S17). FIG. 13 shows an example of the registration confirmation screen G6 displayed on the display unit 3. As shown in FIG. 13, a message asking the user if he or she would like to register the process performed based on the user operation with the file processing information 14 by associating it with the application from which the file 13 is output. After detecting that the user has made the operation to register through the registration confirmation screen G6 (when a result of step S18 is YES), the process registering unit 30 registers the process performed in step S16 as the process about the file with the file processing information 14 (step S19). The user may make the operation not to register (when a result of step S18 is NO). The process registering unit 30 then completes the process without registering with the file processing information 14. When the cooperative application 22 obtains the file 13 from any application via the operating system 20, it is only required for the user to specify the process to perform about the file 13 at least once to enable the cooperative application 22 to automatically perform the process about the file. The user is not required to perform the same operation again and again after at least one operation.

Figure 14:
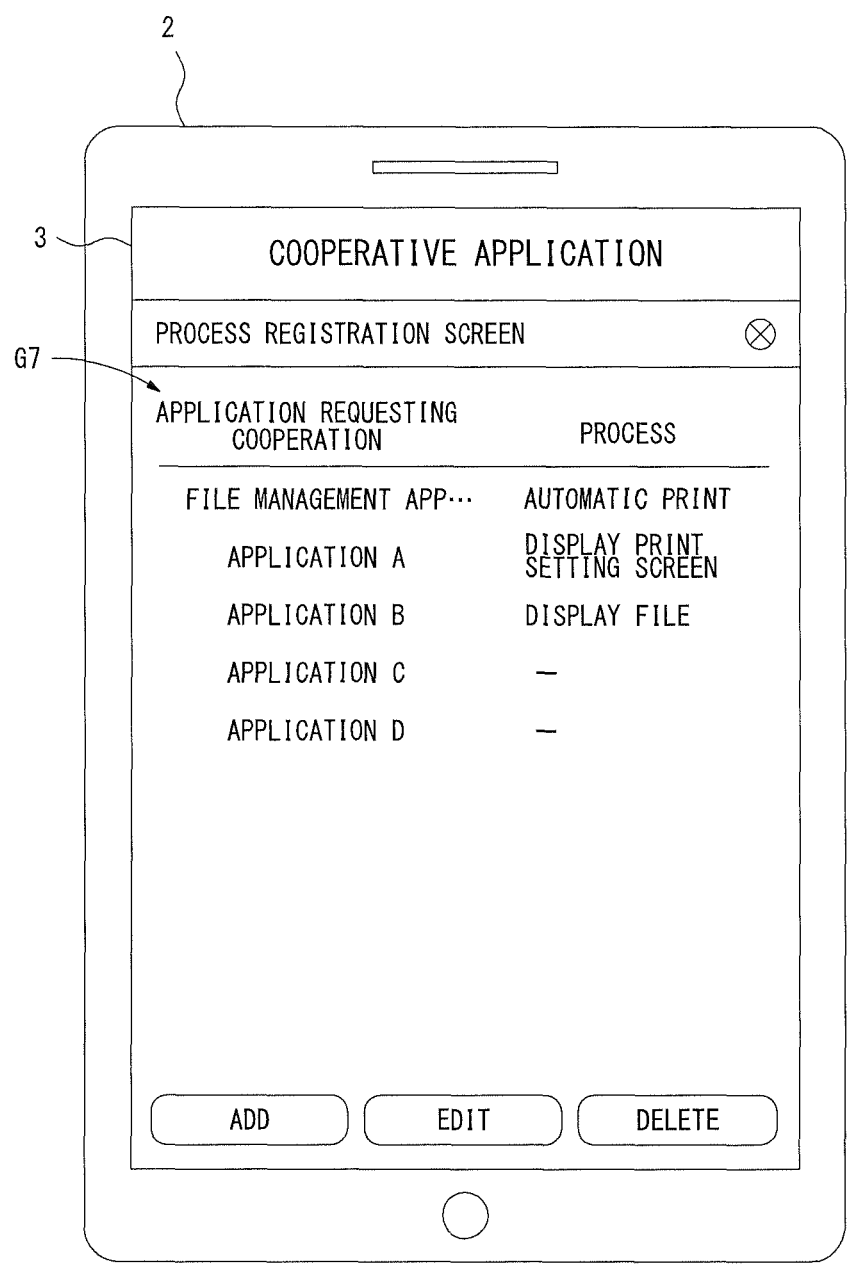
FIG. 14 shows an example of a process registration screen.

The process registering unit 30 becomes operative at any time based on the user operation if the cooperative application 22 is running. In this case, the process registering unit 30 displays a process registration screen on the display unit 3. FIG. 14 shows an example of the process registration screen G7. After being in operation in response to the user operation, the process registering unit 30 displays the process registration screen G7 based on the file processing information 14 in the storage 6, and receives the user operation. The user is allowed to add information relating to the new application, edit the information relating to the existing application and/or delete the information relating to the existing application through the process registration screen G7. The process registering unit 30 registers, edits and/or deletes the information of the file processing information 14 based on the user operation, thereby updating the file processing information 14.

The process of "automatic print" is associated with the unregistered application in the file processing information 14 of FIG. 8. In this case, after obtaining the file 13 from the unregistered application which has not been registered individually with the file processing information 14, the cooperative application 22 starts to automatically print as the process about the file 13. The user registers with the file processing information 14 by associating the unregistered application and the process with each other as shown in FIG. 8. As a result, it is not necessary for the user to update the file processing information 14 every time the new application is installed on the information processing terminal 1.

As the file request C1 requesting the output of the file 13 to another application is issued by the file management application 21 that manages the file 13, the operating system 20 of the information processing terminal 1 according to one or more embodiments of the present invention runs the cooperative application 22 as described above. The cooperative application 22 obtains the file 13 from the file management application 21 via the operating system 20, and refers to the file processing information 14 with which the process that should be performed when the file is obtained is registered for the file management application 21. As a result, the cooperative application 22 determines the process that should be performed about the file 13, and automatically performs the determined process.

As described above, it is not necessary to specify the initial operation of the cooperative application 22 when the file management application 21 calls the cooperative application 22. Even if the file management application 21 is the one provided by the third vendor, the cooperative application 22 is allowed to automatically perform the process depending on the file management application 21 in response to obtaining the file 13 from the file management application 21. To be more specific, the cooperative application 22 is capable of automatically determining the process that should be performed after being running and proceeding with the process whatever application has called it. The cooperative application 22 is capable of reducing the operation load on the user, thereby realizing the better operability than ever before.

When the application is run with the application cooperative function, the process that should be performed after the application is started running is automatically determining and proceeded whatever application has called it. As a result, the information processing terminal and the non-transitory readable recording medium that have better operability may be provided.

Modifications

While certain embodiments of the present invention have been described above, the present invention is not limited to those embodiments. Various modifications may be applied to the present invention.

According to the above-described embodiments, the cooperative application 22 is the application that sends the print job JB to the image forming device 9 as an example. However, this is given not for limitation. The cooperative application 22 may be an email application that has a function to attach the file 13 obtained from the file management application 21 to an email and send the email. Alternatively, the cooperative application 22 may be a server cooperative application that has a function to send the file 13 obtained from the file management application 21 to a predetermined file server and store the file.

According to the above-described embodiments, the file processing information 14 managed by the cooperative application 22 is stored in the storage 6 of the information processing terminal 1. However, this is given not for limitation. To be more specific, the file processing information 14 may be stored in an external server such as a cloud server, for instance.

According to the above-described embodiments, the file obtaining unit 31, the process determining unit 32, the file processing unit 33 and the job transmission unit 34 are configured as the single cooperative application 22. However, this is given not for limitation. The file obtaining unit 31 and the process determining unit 32 may be realized as the single application, and the file processing unit 33 and the job transmission unit 34 may be realized as another application, for example, so that the cooperative application 22 may be formed from two applications. In this case, the application that includes the file obtaining unit 31 and the process determining unit 32 obtains the file 13 from the file management application 21 by Open In cooperation, and determines the process to perform about the file 13 based on the file processing information 14. The application that includes the file obtaining unit 31 and the process determining unit 32 then specifies the determined process by using the cooperative function by the URL scheme, and runs the application that includes the file processing unit 33 and the job transmission unit 34. The application that includes the file processing unit 33 and the job transmission unit 34 is allowed to perform the process specified by the URL scheme. As described above, the application that includes the file obtaining unit 31 and the process determining unit 32 serves as the interface for Open In cooperation. Thus, the application that includes the file obtaining unit 31 and the process determining unit 32 can be shared as the interface of the other applications besides the cooperative application 22, resulting in improvement in versatility.

According to the above-described embodiments, the operating system 20 is mainly the iOS, and the file management application 21 and the cooperative application 22 work together by Open In cooperation. However, this is given not for limitation. To be more specific, the operating system 20 may be an AndroidOS or even another OS.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing terminal that includes an operating system that runs a file management application that manages a file and a cooperative application that is run when a request to output the file is issued by the file management application, comprising:
   a hardware processor that, by the cooperative application:
      obtains the file from the file management application;
      refers to file processing information and determines a process that should be performed about the obtained file, wherein the process is associated with the file management application and registered with the file processing information; and
      processes the obtained file according to the determined process.

2. The information processing terminal according to claim 1, wherein the operating system searches for the cooperative application from among multiple applications installed on the information processing terminal, and runs the cooperative application based on the search result when the request is issued by the file management application.

3. The information processing terminal according to claim 2, wherein the operating system displays the cooperative application extracted through the search, and runs the cooperative application based on a user instruction.

4. The information processing terminal according to claim 1, wherein the hardware processor, by the cooperative application, registers the process, which should be performed when the file is obtained, with the file processing information by associating it with the file management application.

5. The information processing terminal according to claim 4, further comprising:
   a storage in which a variety of information is stored, wherein
   the hardware processor stores the file processing information in the storage.

6. The information processing terminal according to claim 4, wherein the hardware processor is brought into operation if no process corresponding to the file management application is registered with the file processing information when the file is obtained.

7. The information processing terminal according to claim 4, wherein the hardware processor registers the process specified by a user with the file processing information by associating it with the file management application.

8. The information processing terminal according to claim 1, wherein the cooperative application is an application for sending the obtained file to another device from the information processing terminal.

9. The information processing terminal according to claim 8, wherein the cooperative application is an application for sending a print job about the obtained file to an image forming device from the information processing terminal to enable a cooperation with the image forming device for printing.

10. The information processing terminal according to claim 9, wherein
the hardware processor, by the cooperative application, sends the print job to the image forming device,
the hardware processor determines the process to automatically generate the print job about the file and send to the image forming device as the process that should be performed about the obtained file, and
the hardware processor generates the print job based on the obtained file, and sends the print job to the image forming device.

11. The information processing terminal according to claim 9, wherein the hardware processor determines the process to display a print setting screen to generate the print job about the file as the process that should be performed about the obtained file, and the hardware processor displays the print setting screen based on the obtained file.

12. The information processing terminal according to claim 1, wherein the hardware processor determines the process to display contents included in the file as the process that should be performed about the obtained file, and the hardware processor displays the contents included in the file based on the obtained file.

13. The information processing terminal according to claim 1, wherein the hardware processor obtains attribution information using the cooperative application and refers to the file processing information based on the attribution information.

14. A non-transitory computer readable recording medium storing a program to be executed by an operating system on an information processing terminal comprising a hardware processor when a request for output of a file is issued by a file management application that manages the file and that is run by the operating system of the information processing terminal, execution of the program by the operating system causing the information processing terminal to execute steps of:
(a) obtaining the file from the file management application;
(b) referring to file processing information and determining a process that should be performed about the file obtained in the step (a), wherein the process is associated with the file management application and registered with the file processing information; and
(c) processing the file obtained in the step (a) according to the process determined in the step (b).

15. The non-transitory computer readable recording medium according to claim 14, execution of the program by the operating system causing the information processing terminal to execute a further step of:
(d) registering the process, that should be performed when the file is obtained, with the file processing information by associating it with the file management application.

16. The non-transitory computer readable recording medium according to claim 15, wherein the information processing terminal comprises a storage in which a variety of information is stored, and the file processing information is stored in the storage in the step (d).

17. The non-transitory computer readable recording medium according to claim 15, wherein the step (d) is performed in the step (b) if no process corresponding to the file management application is registered with the file processing information when the file is obtained in the step (a).

18. The non-transitory computer readable recording medium according to claim 15, wherein the process specified by a user is registered with the file processing information in the step (d) after it is associated with the file management application.

19. The non-transitory computer readable recording medium according to claim 14, wherein the process to send the file obtained in the step (a) to another device from the information processing terminal is determined in the step (b).

20. The non-transitory computer readable recording medium according to claim 19, wherein the process to send the print job about the file obtained in the step (a) to an image forming device from the information processing terminal to enable a cooperation with the image forming device for printing is determined in the step (b).

21. The non-transitory computer readable recording medium according to claim 20, execution of the program by the operating system causing the information processing terminal to execute a further step of:
(e) sending the print job to the image forming device, wherein
the process to automatically generate the print job about the file and send to the image forming device is determined in the step (b) as the process that should be performed about the file obtained in the step (a), and
the print job is generated based on the file obtained in the step (a), and the print job is sent to the image forming device by performing the step (e) in the step (c).

22. The non-transitory computer readable recording medium according to claim 20, wherein the process to display a print setting screen to generate the print job about the file is determined in the step (b) as the process that should be performed about the file obtained in the step (a), and the information processing terminal is enabled to display the print setting screen based on the file obtained in the step (a) in the step (c).

23. The non-transitory computer readable recording medium according to claim 14, wherein the process to display contents included in the file is determined in the step (b) as the process that should be performed about the file obtained in the step (a), and the information processing terminal is enabled to display the contents included in the file based on the file obtained in the step (a) in the step (c).

24. The non-transitory computer readable recording medium according to claim 14, wherein the information processing terminal obtains attribution information and refers to the file processing information based on the attribution information.

* * * * *